United States Patent
Zaviantseff

[15] 3,676,674
[45] July 11, 1972

[54] APPARATUS FOR IONIZATION ANALYSIS

[72] Inventor: Vladimir T. Zaviantseff, San Francisco, Calif.

[73] Assignee: The United States of America as represented by the Administrator of the National Aeronautics and Space Administration

[22] Filed: July 16, 1970

[21] Appl. No.: 55,536

[52] U.S. Cl.....................250/71.5 R, 250/41.9 D, 313/356
[51] Int. Cl............................................G01t 1/20
[58] Field of Search..............250/41.9 D, 71.5 R; 313/356

[56] References Cited

UNITED STATES PATENTS 3,538,328   11/1970   Strausser..................250/71.5 R

OTHER PUBLICATIONS

Gibbs et al., "Large Aperture, High Efficiency Ion Detector" The Review of Scientific Instruments, vol. 37, no. 10, Oct. 1966, pp. 1385–1390.

*Primary Examiner*—Walter Stolwein
*Assistant Examiner*—Davis L. Willis
*Attorney*—Darrell G. Brekke and John R. Manning

[57] ABSTRACT

Apparatus for ionization analysis comprising generally concentric outer and inner tubular shaped electrodes between which a d-c potential is applied so as to produce an electric field therebetween. Adjacent scintillating and photoemissive members are mounted inside the inner electrode, and generally aligned front and rear apertures are formed in the electrodes. Positive ions from a source of ions are directed through the front apertures and onto the scintillating member for the production of light pulses therein. Light from the light pulses striking the photoemissive member produces photoelectrons which are directed outwardly from the electrodes through the rear apertures therein. Electron multiplying means may be positioned to receive the photoelectrons for amplifying the same. With this arrangement the d-c potential which produces the electric field functions to accelerate both the incident positive ion beam and the photoelectrons produced by the photoemissive member.

6 Claims, 3 Drawing Figures

APPARATUS FOR IONIZATION ANALYSIS

DESCRIPTION

The invention described herein was made by an employee of the United States Government and may be manufactured and used by or for the Government for governmental purposes without the payment of any royalties therein or therefor.

This invention relates to an ionization analysis apparatus and more particularly to an apparatus for charge analysis of an incident positive ion flux.

Prior art analyzers are known which include inner and outer electrodes and a scintillator within the inner electrode. Positive ions are accelerated from the outer electrode onto the scintillator within the inner electrode for production of light pulses therein. A light pipe extends from the inner electrode to the outer electrode to carry the light pulses which are then viewed by a photomultiplier tube, or the like, placed adjacent thereto, but outside the envelope in which the electrodes and scintillator are located. Disadvantages of this arrangement include the following: light pulses are attenuated in traveling through the light pipe and contribute to deterioration in resolution, light striking the light pipe at an angle greater than the critical angle is lost for observation, and the light pipe extending between the electrodes increases the possibility of high voltage breakdown therebetween.

An of this invention is the provision of a positive ion charge analyzer which avoids the above-mentioned and other deficiencies and shortcomings of prior art analyzers.

An object of this invention is the provision of apparatus for analyzing positive ion charge which is highly efficient.

An object of this invention is the provision of apparatus for ion analysis by means of which a single voltage difference is employed for acceleration of both the incident ion beam and photoelectrons produced by the apparatus.

An object of this invention is the provision of apparatus for ion analysis of the scintillation type which requires no light pipe for conveyinG light pulses to a photoelectrode.

An object of this invention is the provision of an analyzing apparatus which fully utilizes a d-c potential difference between concentric electrodes included therein.

The above and other objects and advantages are achieved by an ion analyzer comprising inner and outer electrodes with means for applying a potential therebetween. A scintillator and photocathode are mounted inside the inner electrode, and apertures are formed in the electrodes through which an ion beam may pass to strike the scintillator, and through which photoelectrons from the photocathode may pass to an anode located outside the outer electrode. The one potential applied to the electrodes produces a first electrical field for acceleration of the ion beam and a second electrical field for acceleration of the electrons. The anode may be included in an electron multiplier arrangement which may be located in the same evacuated envelope housing other elements of the analyzer.

The invention will be better understood from the following detailed description considered in light of the drawings. In the drawings, wherein like reference characters refer to the same parts in the several views.

Figure 1:
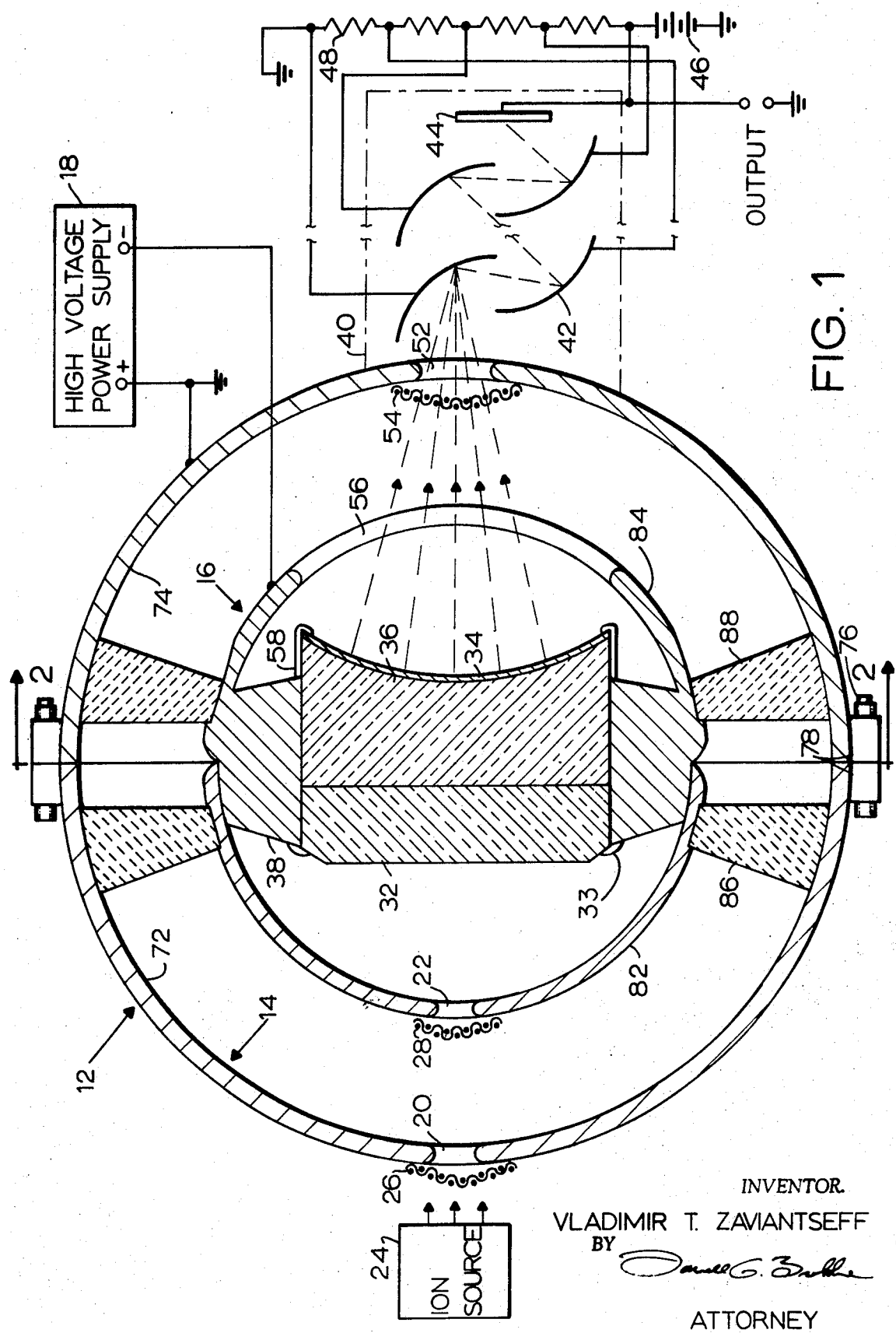
FIG. 1 is a central sectional view taken through the center of a preferred embodiment of the invention and schematically illustrating electrical connections thereto.
Figure 2:
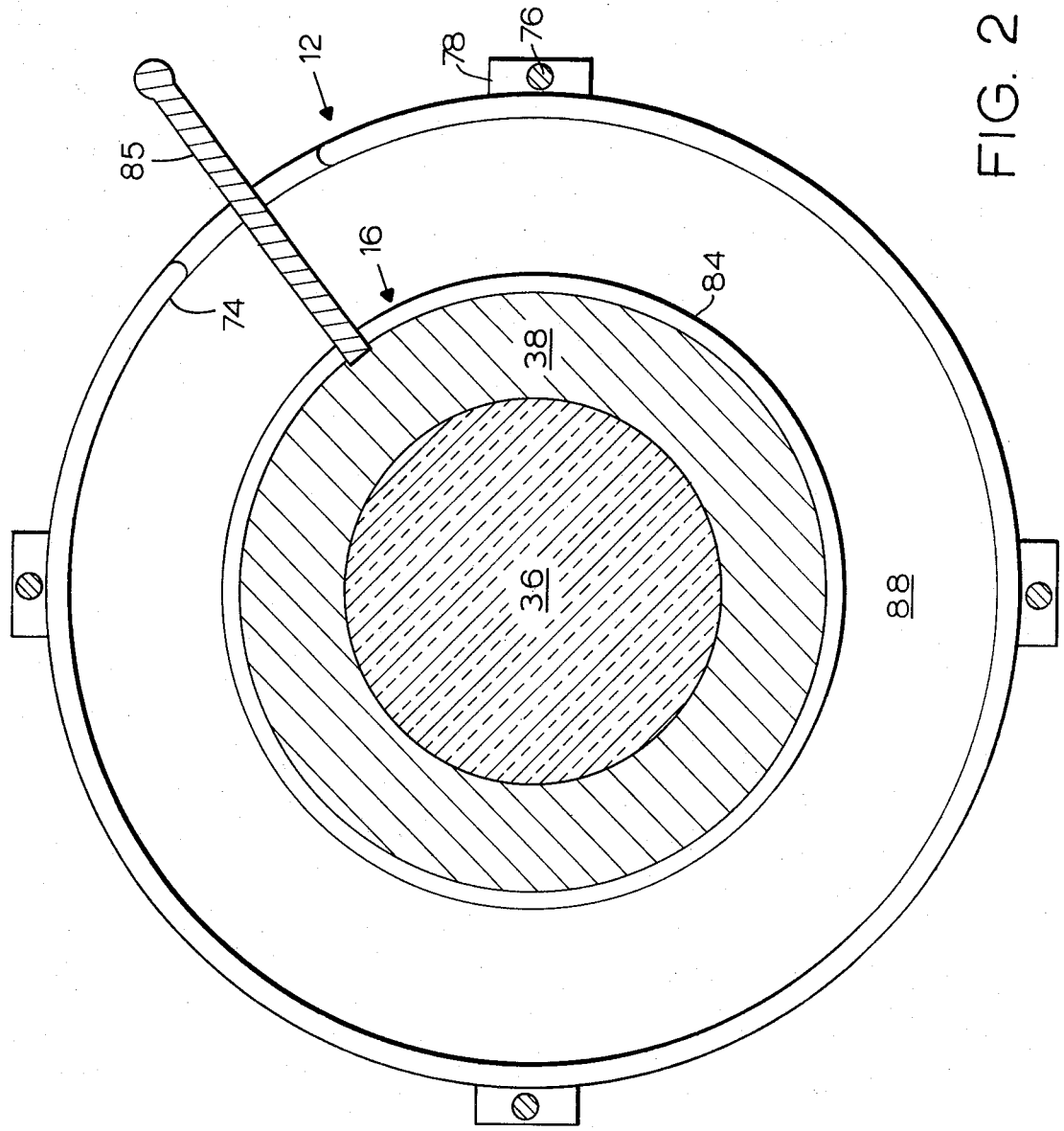
FIG. 2 is a transverse center sectional view taken in the plane 2—2 of FIG. 1.

Reference is first made to FIGS. 1 and 2 of the drawings illustrating a preferred embodiment of an ion analyzer 12 in accordance with the present invention. An outer hollow electrode 14 is provided in the shape of a sphere about an inner hollow electrode 16 also having a spherical shape and concentrically disposed within the outer electrode. The electrodes 14 and 16 are adapted to have a high potential applied therebetween and this is schematically illustrated by a high voltage source 18 having, for example, a negative terminal thereof connected to the inner electrode 16 and the positive terminal thereof grounded and connected to the outer electrode 14. A suitable negative terminal 85 for electrode 16 is depicted in FIG. 2. The ion analyzer of the present invention is adapted to receive ions from the exterior thereof and to this end there are provided aligned apertures 20 and 22 through the outer and inner electrodes 14 and 16 respectively. Ions to be analyzed by the present invention may be generated in any of a large variety of ways and thus there is only generally indicated at 24 an ion source exteriorly of the invention. It will be appreciated that with the inner electrode 16 maintained at a highly negative potential with respect to the outer electrode 14, ions entering the aperture 20 will be accelerated toward the inner electrode to thus pass through the aligned aperture 22 therein. There may, if desired, be provided curved screens or grids 26 and 28 across the openings 20 and 22, respectively, for defining the electric fields across these openings to enhance focusing of the ions in passage through the apertures.

Within the inner electrode 16 of the present invention there is provided means for converting ions to electrons and to this end there is provided a scintillation crystal 32 Within the inner electrode 16 and facing the ion aperture 22 in the electrode. This scintillation crystal will produce light pulses or scintillations when struck by ions. Also within the inner electrode 16 there is provided a photoemissive member or photocathode 34 optically connected to the scintillation crystal 32 for producing photoelectrons from incident light pulses produced by the scintillation crystal. The photoemissive member 34 may be provided as a coating upon the outer surface of a light permeable support 36 abutting the back side of the scintillation crystal. The crystal 32 and support 36 carrying the photoemissive member 34 may all be mounted in a sleeve 38 within the inner electrode 16, as shown in FIG. 1.

Electron currents produced by the photoemitter 34 may be expected to be quite small and thus the present invention employs an electron multiplier 40 to amplify this current. Electron multipliers are well known in the art and thus no attempt is made herein to describe same in detail other than to briefly note that the unit includes a plurality of successive dynodes 42 and a terminal collector 44. Successively increasing positive potentials are applied to successive dynodes toward the collector, with the highest positive potential applied to the collector, as schematically illustrated by the power supply 46 and voltage dividing resistor 48 of FIG. 1.

The electron multiplier 40 is disposed exteriorly of the outer electrode 14 and communicates with the interior thereof through an aperture 52 formed in the outer electrode, as shown. The aperture 52 is disposed in facing relationship to the photoemissive member 34 so that photoelectrons emitted from the latter and accelerated therefrom by the electric field between the inner and outer electrodes will cause these photoelectrons to pass through the aperture 52. The photoemission member 34 is formed with a concave surface and this configuration is provided for focusing of electrons emitted therefrom. The inner electrode 16 has a large opening 56 adjacent the emitter 34 but preferably somewhat smaller in area than the emitter to provide for passage of the electrons. A screen 54, which may be provided across the outer aperture 52, serves to define the electric field in the interelectrode region, to enhance focusing of photoelectrons and to prevent high electric field from interfering with the proper operation of the amplifier to the right of aperture 52. The electron-multiplier amplifies the current of electrons produced by the emitter 34 so that the current impinging upon the collector 44 of the multiplier is sufficiently large to be subsequently employed in following circuitry as described below.

It will be appreciated that the electric field established between the inner and outer electrodes of the present invention serves the dual purpose of accelerating ions inwardly of the device and accelerating electrons outwardly therefrom. Thus a material simplification in structure is achieved. It is also to be noted that the emitter 34 of the present invention is electrically connected to the inner electrode 16 as, for example, by a conductor 58 extending from the emitter to the inner electrode or to an electrically conducting member connected thereto. It is also to be noted that the electron exit apertures 52 and 56 in the outer and inner electrodes 14 and 16, respectively, need not necessarily be disposed diametrically opposite to the ion inlet apertures 20 and 22 in these electrodes. In the event, however, that the electron exit is offset from that illustrated, it is yet preferable for the curvature of the emitter 34 to be oriented to focus the emitted electrons toward the outlet apertures. It will, of course, be appreciated that the invention is to be operated in an environment that is totally dark and also free of interfering magnetic fields. Furthermore, the invention must be operated in a vacuum environment having a pressure, for example, of the order of $10^{-5}$ torr or less. Such an environment may be encountered in outer space or in any conventional vacuum system.

The invention has been generally described above with respect to major elements and functions thereof. Although the invention has been generally described, there is set forth below details of construction of a particular preferred embodiment of the invention. In practice, construction of the device is generally accomplished by construction of the scintillation section and of the emitter section separately. The outer electrode 14 is formed of a metallic material such as stainless steel (SS No. 304) in two hemispherical sections 72 and 74 joined together by bolts 76 extending through mating flanges 78 about the exterior of the sections. Similarly the interior electrode 16 is formed of two hemispherical sections 82 and 84 in the internal sleeve 38 employed within the inner electrode 16 for mounting of the scintillation crystal 32 and support 36 may either be formed integrally with one of the inner electrode sections 84 or may be formed separately. The inner electrode sections as well as the sleeve 38 are formed of a metallic material such as stainless steel noted above.

Because of the high electrical field gradient between the inner and outer electrodes, it is important to take suitable precautions against arcing or flashover. To this end, corners and rough surfaces are eliminated and it will be noted that, for example, the edges of apertures are rounded. Furthermore, all metallic and insulated surfaces are preferably polished to 32 microinches or better with edges being rounded off and corners helium arc welded.

The inner and outer electrodes section 72 and 82 of the scintillation section are joined together by two or more wedge-shaped insulating supports 86 which may, for example, be formed of a dielectric material such as 85 – 95 percent glazed alumina ceramic bonded to the stainless steel electrodes by the use of vacuum tube grade bonding alloys, such as a silver-copper eutectic with a melting point of about 780° C. An annular support 88 of similar dielectric material is employed to mount the inner electrode section 84 within the outer electrode section 74. [The spaces between adjacent supports 86 permit outgassing by the dielectrics. If this were not done, trapped gas between insulators 86 and 88 could possibly cause arcing.] The apertured grids 26, 28 and 54 may, for example, each be formed of a gold plated tungsten screen with the corners rounded to prevent arcing and these screens may be spot welded over the respective apertures. Not only do the screens serve the purpose of focusing but in the case of the exit grid 54 protection is provided thereby against arcing.

The light permeable support 36 is fitted within the Sleeve 38 and sealed with a bonding alloy such as, for example, one of the alloys listed in Table IX, page 25, of "Glass-to- Metal Seals" by J. H. Partridge, Society of Glass Technology, Sheffield, England, 1949. The support 36 may, for example, be formed of 7056 Corning glass for the visible light range and sapphire for the ultraviolet range. Examples of suitable Materials for the scintillation crystal include thalium-activated cesium iodide, sodium-activated cesium iodide, and cesium iodide. The emitter or photocathode 34 may be formed by sputtering or other coating process in high vacuum in the order of $10^{-8}$ torr. Examples of photocathode materials include multi-alkali and bi- alkali compositions providing spectral responses of S-1 to S-23. A drop of viscous optical oil such as Dow Corning silicon fluid 200 series having a viscosity of 12,500 to 60,000 centistokes may be employed on the surface of the light permeable support in contact with the scintillation crystal and the crystal may be sealed in the sleeve 38 by means of an epoxy cement 33 such as "Ferris Supreme" pearl cement manufactured by Jeweler Aids Company. The epoxy cement 33 is also provided to prevent the oil from escaping from the interface between members 32 and 36. The electron emission section of the device as illustrated in FIG. 1 is to be maintained at a high vacuum and thus the seals must be capable of holding this vacuum.

With regard to the electron multiplier of the present invention, it is noted that these are widely known in the art and thus are not further described herein. Reference Is made, for further infOrmation on this point, to the publication "Encyclopedic Dictionary of Physics" published in 1962 by the McMillan Company, New York, N.Y., particularly to pages 483 to 486 thereof.

Figure 3:
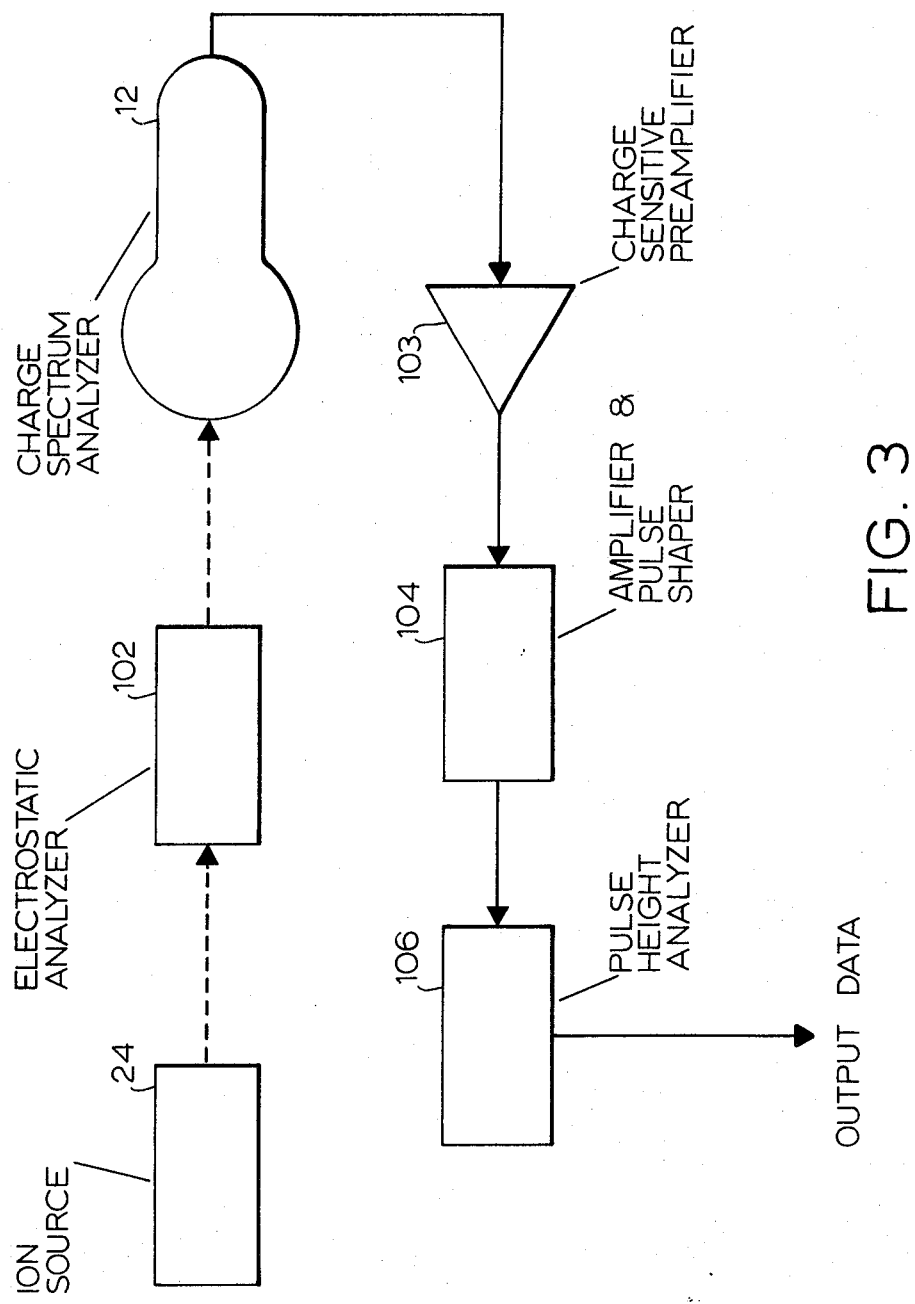
FIG. 3 is a block diagram of an analysis system including the present invention.

The apparatus of the present invention may, for example, be employed in overall systems such as that illustrated in FIG. 3 of the drawings. Referring to FIG. 3, there is shown an ion source 24 which may be any type of conventional source, even including free ions in outer space, and an electrostatic analyzer 102 receiving ions frOm the source and transmitting all ions of a fixed energy per charge value to the ionization analyzer 12 of the present invention. The output from the electron multiplier or photo multiplier of the present invention is shown to be applied to a charge sensitive preamplifier 103 having the outlet applied to a pulse shaper 104 in turn having the output applied to a pulse height analyzer 106.

Considering operation of this system somewhat further, it is noted that ions from the source have an initial kinetic energy, $E_i$, which is a function of charge and source potential:

$$E_i = 1/2 m v_i^2 = q V_i \text{ or } v_i = \sqrt{2qV_i/m} \quad (1)$$

where $m$ is the ion mass in kilograms, $V_i$ is a known ion source potential difference in volts, $v_i$ is the velocity of the ionS in meters per second, and $q$ is the charge on the ions in coulombs.

In an electrostatic analyzer, the kinetic energy is equal to the electrostatic energy:

$$\frac{E_i}{q} = \frac{\frac{mv_i^2}{2}}{q} = \frac{\Phi}{\ln r_2/r_1} \quad (2)$$

where $\Phi$ is the $\pm$ potentials of the concentric cylindrical electrodes of the electrostatic analyzer in volts, $r_1$ is the inner electrode radius, and $r_2$ is the outer electrode radius, both in meters.

The electrostatic analyzer thus transmits all ions of fixed energy per charge value for a given value of $\Phi$ applied to the plates. Since the geometry of the analyzer is fixed, and since the potential $\Phi$ is known or can readily be measured, the ratio of energy $E_i$ to charge $q$ is known. Therefore, is if is determined, the energy $E_i$ can be readily calculated by substituting values in equation (2). Suitable electrostatic analyzers are described at pages 348 – 362 of "Space Probes and Planetary Explorations," a book by William R. Corliss published in 1965 by D. Van Nostrand Company, Inc., Princeton, N. J. Alternatively, a magnetic sector such as ORTEC, Inc Model 3404 Beam Analyzing Magnet may be used, in which case the resulting information would be in terms of mass per unit charge.

Moving on in the schematic of FIG. 3 to the charge spectrum analyzer, it is noted that after crossing the interelectrode region between 12 and 16, the ions gain an additional amount of energy, $E_a$, wherein $$E_a = qV \quad (3)$$

$q$ is the charge of the ions in coulombs, and $V$ is the d-c potential difference in volts between outer and inner electrodes 12 and 16, respectively.

The total energy, $E_t$, of the ions is the sum of its initial energy and its additional energy:

$$E_t = E_i + E_a = q(V_i + V) \quad (4)$$

In many applications, such as in solar wind measurements, $V$ is often larger than $V_i$ by as much as from one to two orders of magnitude. Consequently, in those cases $E_i$ can be disregarded and the total energy of the ions can be approximated by:

$$E_t = qV \quad (5)$$

In this equation, if V is maintained constant for all measurements the only variable is $q$ which is the charge of the ions. The fact that $E_t$ is solely a function of charge enables charge discrimination of ions because this amount of energy is delivered to the crystal. Ions with higher charge states will not penetrate the crystal in proportion to their energy because of higher coulomb repulsion with the crystal lattice.

The light output from crystal 32 and the number of electrons impinging on collector 44 is proportional to the charge of the ions from the ion source. The charge spectrum analyzer may, fOr example, be calibrated through the use of a known ion source. Once calibrated, the charge spectrum analyzer provides a measure of the specific charge of the ions from ion source 25.

Preamplifier 103 accomplishes charge-to-voltage conversion and amplifier/shaper 104 provides high gain as well as pulse shaping. As ions from source 24 impinge on charge spectrum analyzer 12, pulses are produced in the outputs of analyzer 12, preamplifier 103 and amplifier/shaper 104. The height of these pulses is proportional to the charge of the incident ions. The pulse height analyzer 106 measures the magnitude of each pulse, segregates the pulses in channel bands, and counts the number of pulses in each channel band. Each channel band represents a different charge level (level is determined by calibration).

Examples of equipment which may be used for the preamplifier, amplifier/shaper and pulse height analyzer are Canberra, Inc. Model 1405, Canberra, Inc. Model 1410, and Nuclear Data, Inc. Series ND2200, respectively.

Once the charge is measured with pulse height analyzer 106, one calculates $E_i$ by using equation (2). If a conventional magnetic sector is substituted for the electrostatic analyzer 102, the ions reaching charge spectrum analyzer 12 will have a known mass per unit charge value. Once the charge is measured with pulse height analyzer 106, one can then calculate the mass of the incident ions.

Of course, many modifications may be made in the above system within the scope of this invention. For example, when it is desired to operate the charge spectrum analyzer with light entering the chamber preceding scintillator crystal 32, the input surface of scintillator 32 may be coated with a light opague metallic layer which is thin enough to transmit the incident ions. Such a metallic layer, when electrically connected to sleeve 38, may also be used to eliminate any surface charge accumulating on the face of scintillator 32. Also, the illustrated multiplier may be provided with a different number of dynode stages, if desired, or a Bendix Corp. Channeltron may be used instead. The invention is not limited to any particular shape of electrodes. It is intended that the above and any other such changes and modifications shall fall within the spirit and scope of the invention as defined in the aPpended claims, in which claims the term hollow electrode is intended to include the illustrated electrode shapes and other such shapes not shown.

Having described my invention, I claim:

1. Apparatus for analyzing positive ions comprising inner and outer hollow electrodes,
    means for applying a potential difference between said electrodes,
    means for converting positive ions to electrons within the inner electrode,
    inlet and outlet apertures in the electrodes to allow positive ions to pass to the converting means from outside the outer electrode and electrons to pass from the converting means and out of the outer electrode, respectively,
    said means for converting positive ions to electrons comprising a scintillation device and a photoemissive member adjacent thereto, with the scintillation device positioned to receive positive ions through the inlet apertures and the photoemissive member positioned to direct electrons therefrom through the outlet apertures.

2. The apparatus for analyzing positive ions as defined in claim 1 wherein the inner electrode is rendered negative with respect to the outer electrode by the potential difference therebetween whereby the positive ions are accelerated toward said scintillation device and the electrons are accelerated from the photoemissive member by said potential difference between the electrodes.

3. The apparatus for ionization analysis as defined in claim 2 wherein said first and second electrodes are spherically shaped and generally coaxially positioned.

4. Apparatus for ionization analysis comprising:
    a scintillating member,
    a photoemissive member adjacent the scintillating member,
    means for directing ions onto the scintillating member to produce pulses of light therein for illumination of the photoemissive member,
    means for attracting electrons emitted from the photoemissive member, and
    said means for directing ions onto said scintillating member and said means for attracting electrons emitted from said photoemissive member comprises means for producing a spherically shaped electric field around said scintillating member and said photoemissive member.

5. The apparatus for ionization analysis as defined in claim 4 wherein said means for producing an electric field comprise first and second electrodes which are generally coaxially spaced and which generally have an O-shaped cross section, each of said electrodes being formed with front and rear apertures to receive ions and pass electrons, respectively, and means for applying a d-c potential across said electrodes.

6. The apparatus for ionization analysis as defined in claim 4 wherein said means for producing an electric field comprises first and second spaced electrodes of spherical shape, and means for applying a d-c potential across said electrodes, said electrodes being generally coaxially positioned, each of said electrodes having an entrance passage and an exit passage, and each of said passages being substantially centered on a common axis.

* * * * *